J. W. SMITH.

Improvement in Combined Thrashing and Hulling Machines.

No. 132,868.                                            Patented Nov. 5, 1872.

Attest                                                  Inventor
                                                        John W. Smith

UNITED STATES PATENT OFFICE.

JOHN W. SMITH, OF BRYAN, OHIO, ASSIGNOR OF ONE-HALF HIS RIGHT TO MORRISON AND FAY, OF SAME PLACE.

IMPROVEMENT IN COMBINED THRASHING AND HULLING MACHINES.

Specification forming part of Letters Patent No. 132,868, dated November 5, 1872.

*To all whom it may concern:*

Be it known that I, JOHN W. SMITH, residing at Bryan, in the county of Williams and State of Ohio, have invented a certain Improvement in Combined Thrashing-Machine and Clover-Huller, of which the following is a specification:

This invention relates to that class of thrashing-machines which, to adapt them for separating and hulling clover-seed as well as thrashing grain, are provided with a suitable hulling apparatus and a deflector or other equivalent device, which latter is so arranged in relation to the grain-belts and hulling apparatus that by a simple adjustment of the deflector the seed may be carried from the thrashing-cylinder either directly to the winnower, or in its transit from the former to the latter passed through the intermediately-located hulling apparatus. My improvement consists in the particular construction and arrangement of an adjustable deflector in relation to the inclined board under the straw-carrier, the grain belts or carriers, and the hulling apparatus, which will be generally set forth in the following description, and specifically pointed out in the claim.

Figure 1:
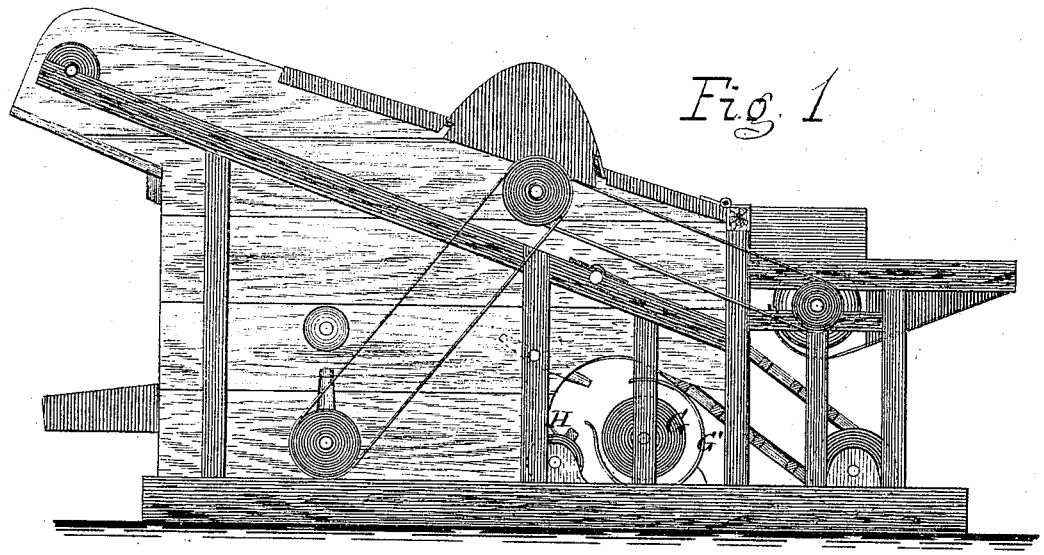
Figure 2:
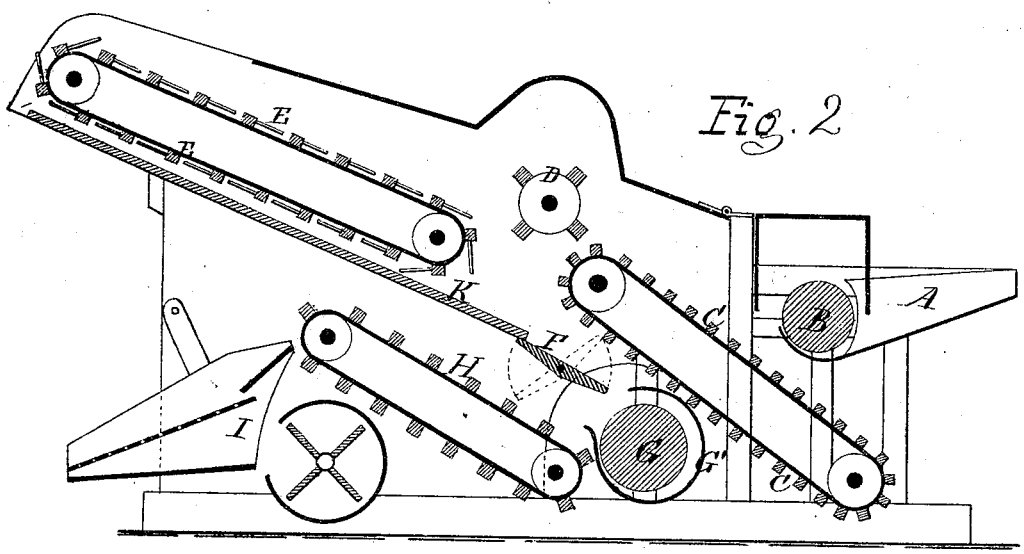

Figure 1 is a side elevation. Fig. 2 is a longitudinal section.

The same letters of reference are employed in both figures in the designation of identical parts.

The grain or clover is fed into the machine over the table A to the thrashing-cylinder B, where most of the seed is separated from the straw or stalks falling down upon the grain-conveying belt C. The straw or stalks pass onward to the beater D, where the second and final separation of seed still remaining therein takes place, and are then delivered to the straw-carrier E, which discharges them at the rear end of the machine. The buckets on the grain-belt C carry the seed upward and discharge it upon the deflector F, arranged beneath its upper end. This deflector consists of an adjustable valve centrally pivoted, and which may be disposed either in the position shown in full lines in Fig. 2, or in that shown by dotted lines in the same figure. In the former case the seed will be directed upon the hulling-cylinder G, to be hulled by it in conjunction with the concave G′, the surfaces of the two being suitably roughened or otherwise prepared for the performance of this work. The seed and chaff are discharged from the hulling apparatus upon the second grain-conveying belt H, by which they are borne to and delivered upon the screen and winnower I. Such will be the disposition of the deflector F and the course of the seed when the machine is used for thrashing and hulling clover-seed. In thrashing wheat and other grain the deflector is turned, by a hand-lever or other suitable device, into the position indicated by dotted lines in Fig. 2 to direct the grain from the first grain-belt, C, directly upon the second one, H, so that it will pass from the thrashing-cylinder directly to the winnower. Beneath the straw-carrier E is an inclined surface or board, K, down which any grains from the straw or stalks will slide and be delivered upon the deflector to guide them in the proper direction.

I am aware that adjustable valves have heretofore been used in this class of machines for directing the seed either directly to the belt which carries it to the winnower or through an intermediate hulling apparatus, and do not, therefore, claim this feature, broadly. The distinguishing characteristic of my invention consists in the employment of a centrally-pivoted deflector, and so disposed in a machine arranged for hulling as well as thrashing that it shall cause the seed delivered upon it from the belt C and grain-board K to fall or shoot from it upon the top of the hulling-cylinder or directly upon the carrier H without passing through the hulling mechanism, as may be desired.

What I claim as my invention, and desire to secure by Letters Patent, is—

The combination of the adjustable deflector F, the grain-conveying belts C and H, incline K, and hulling apparatus G G′, when said deflector is constructed and arranged to operate in the manner shown and described, and for the purpose set forth.

In testimony whereof I have signed my name to this specification this 15th day of December, 1871, in the presence of two subscribing witnesses.

J. W. SMITH.

Witnesses:
    JOS. R. EDSON,
    J. WILLIAM MISTER.